UNITED STATES PATENT OFFICE.

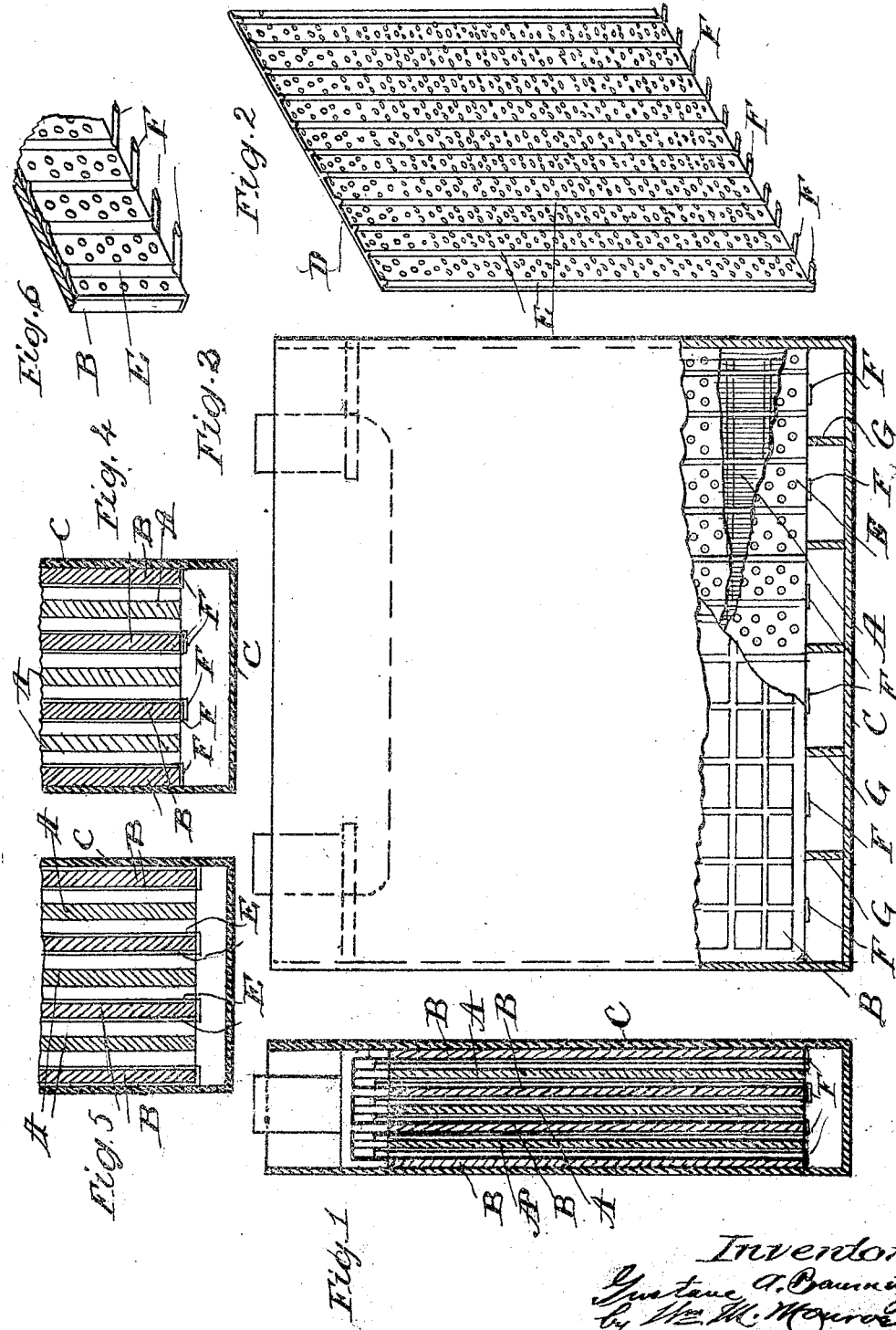

GUSTAVE A. BAUMETZ, OF CLEVELAND, OHIO.

STORAGE BATTERY.

1,415,139.

Specification of Letters Patent.

Patented May 9, 1922.

Application filed December 8, 1919. Serial No. 343,366.

*To all whom it may concern:*

Be it known that I, GUSTAVE A. BAUMETZ, a citizen of the United States, and resident of Cleveland, in the county of Cuyahoga and State of Ohio, have invented certain new and useful Improvements in Storage Batteries, of which I hereby declare the following to be a full, clear, and exact description, such as will enable others skilled in the art to which it appertains to make and use the same.

The invention relates to improvements in the insulation plates which are inserted in storage batteries between the positive and negative plates of the battery, and are employed to prevent mechanical and electrical contact between the said positive and negative plates, and to prevent the consequent short circuiting of the electric current, and the destruction of the battery caused by the overheating and precipitation of the active material with which the ribs of said plates are filled.

Insulating plates constructed of porous wood and perforated hard rubber, have been employed, but with the following disadvantages, that when the plates become buckled by overheating, as when the battery is charged or discharged at an excessive amperage relative to its capacity, the insulating plates will become buckled or displaced permitting the positive and negative plates to make mechanical and electrical contact with each other.

This action would prevent the battery from receiving a charge, or delivering a charge to an outside circuit. Also the constant jarring action of an automobile when on a rough road sometimes causes the insulator plates to creep upward until there is sufficient space left unprotected at the lower edges of the positive and negative plates to permit them to make contact with each other.

To prevent such action and to make it impossible for the insulating plates to rise and thus leave the lower edges of the positive and negative plates unprotected, each insulating plate is provided with an inwardly turned lower edge or lugs which overlap the lower edge of the adjacent negative plate.

The invention also includes the manner of construction of the various details, as hereinafter described, shown in the accompanying drawings, and specifically pointed out in the claims.

In the accompanying drawings Fig. 1 is a transverse section of the storage battery showing positive and negative plates, the electrolyte, and the insulating plates constructed according to my invention; Fig. 2 is a perspective of one of the insulator plates showing the inwardly turned lower edge thereof; Fig. 3 is a longitudinal section of the battery; Fig. 4 is an enlarged transverse section of the battery; Fig. 5 is a similar view showing modified insulators; Fig. 6 is an enlarged portion of Fig. 2.

In these views A and B are the positive and negative plates respectively, C the casing and D, D, the insulating plates. The insulating plates are inserted between the positive and negative plates or grids containing active matter, and lie closely adjacent to the negative plates but are spaced from the positive plates by means of vertical bars E, E, since space must be provided for the discharge of active material, which is most frequent from the positive plates.

To prevent the insulating plates from creeping upward or becoming displaced when the other plates become buckled, portions of the lower edges of the insulating plates or the lower extremities of the bars, or other portions of the plates are turned inward at F, F, to pass underneath the negative plates. Preferably the bars E are extended in length and turned laterally outward to pass underneath the adjacent plates. These bars can be turned to either side as desired.

All the plates, positive, negative and insulating, rest upon low ribs G, G, at the bottom of the casing and when flanges are employed the lower edges of the insulator plates are cut away at intervals to permit the turned in flanges to pass underneath plates and if lugs are employed they can be so spaced as not to interfere with the ribs G, G, but pass between them.

The insulator plates are preferably formed of a material which while possessing acid resisting qualities, will contrast in color with the positive and negative plates, so that the eye will quickly perceive if one is omitted when assembling the battery parts, and also are formed of a tough and durable material that will not easily become broken, such as celluloid.

The insulating plates are perforated to permit the passage of the electrolyte.

When the entire edges of the insulating plates are flanged or turned across the lower edges of the negative plates the active material will fall freely from the positive plates when loosened, into the pockets formed between the ribs at the bottom of the casing, but when the ends of the ribs are turned over or spaced lugs are employed for this purpose they can be extended and passed over the edges of the positive plates without interfering with the fall of such material.

In Fig. 5 the lower edges of two bottom plates are connected giving them a U shape.

This makes it impossible to leave out an insulating plate by accident and it will not be necessary that any of the flanges, ribs or bars F, F, should overlap as shown in Fig. 4.

Having described the invention what I claim as new and desire to secure by Letters Patent is:

1. In a storage battery, in combination a casing, alternating positive and negative plates therein, insulating plates intermediate of said positive and negative plates, and lateral projections extended from the lower edges of said insulating plates engaging the adjacent plates.

2. In a storage battery, in combination, a casing, a multiple number of alternating positive and negative plates therein, ribs in the bottom of said casing, on which said plates rest and intermediate insulating plates, said insulating plates provided with lateral projections on their lower edges said projections constructed and arranged to pass underneath adjacent plates between said ribs.

3. In a battery, in combination a casing alternating the positive and negative plates therein, and insulating plates intermediate the positive and negative plates and provided with vertical spacing ribs arranged at intervals and having their lower ends extending to form lateral projections, said lateral projections engaging under the lower edges of adjacent plates.

4. In a storage battery in combination, a casing alternating positive and negative plates in said casing and intermediate insulating plates, said insulating plates perforated and formed of a material contrasting in color with the other plates.

5. In a storage battery in combination, a casing alternating positive and negative plates in said casing and intermediate insulating plates, said insulating plates perforated and formed of a material contrasting in color with the other plates and means preventing the displacement of the insulating plates relatively to the other plates.

In testimony whereof, I hereunto set my hand this 26" day of November, 1919.

GUSTAVE A. BAUMETZ.

In presence of
 W<small>M</small>. M. M<small>ONROE</small>,
 S. A. W<small>ILLIAMSON</small>.